United States Patent
Sebire et al.

(10) Patent No.: US 12,238,570 B2
(45) Date of Patent: Feb. 25, 2025

(54) METHOD, APPARATUS, AND COMPUTER PROGRAM PRODUCT FOR ALTERNATIVE QUALITY OF SERVICE PROFILE NOTIFICATION HANDLING

(71) Applicant: NOKIA TECHNOLOGIES OY, Espoo (FI)

(72) Inventors: Benoist Sebire, Tokyo (JP); Devaki Chandramouli, Plano, TX (US); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 17/788,400

(22) PCT Filed: Dec. 18, 2020

(86) PCT No.: PCT/FI2020/050851
§ 371 (c)(1),
(2) Date: Jun. 23, 2022

(87) PCT Pub. No.: WO2021/130409
PCT Pub. Date: Jul. 1, 2021

(65) Prior Publication Data
US 2023/0023254 A1 Jan. 26, 2023

Related U.S. Application Data

(60) Provisional application No. 62/953,048, filed on Dec. 23, 2019.

(51) Int. Cl.
*H04W 28/02* (2009.01)
(52) U.S. Cl.
CPC ... *H04W 28/0268* (2013.01); *H04W 28/0252* (2013.01)

(58) Field of Classification Search
CPC ......... H04W 28/0268; H04W 28/0252; H04W 28/12
See application file for complete search history.

(56) References Cited

U.S. PATENT DOCUMENTS 6,965,948 B1 * 11/2005 Eneborg .............. H04L 12/5692
709/227
8,548,465 B2 * 10/2013 Mueck .................. H04H 20/24
455/434

(Continued)

FOREIGN PATENT DOCUMENTS

EP 3148285 A1 3/2017
EP 3528532 A1 8/2019

(Continued)

OTHER PUBLICATIONS

3GPP TS 38.300 V16.0.0 (Dec. 2019) Technical Specification 3rd Generation Partnership Project; Technical Specification Group Radio Access Network; NR; NR and NG-RAN Overall Description; Stage 2 (Release 16). (Year: 2019).*

"3rd Generation Partnership Project; Technical Specification Group Radio Access Network; NR; NR and NG-RAN Overall Description; Stage 2 (Release 16)", 3GPP TS 38.300 v16.0.0, (Dec. 2019), 101 pages.

(Continued)

Primary Examiner — Yuwen Pan
Assistant Examiner — Swati Jain
(74) Attorney, Agent, or Firm — Barta Jones, PLLC

(57) ABSTRACT

A method, apparatus, and computer program product provide for generating and providing a signaling indicator to manage quality of service notifications in a network. In the context of a method, the method receives a signaling indicator from a user device. The signaling indicator includes data associated with one or more preferences of the user device. The method further receives a quality of service notification associated with the user device. The method also determines, based on the signaling indicator, whether to provide the quality of service notification to the user device.

23 Claims, 4 Drawing Sheets

(56) References Cited

U.S. PATENT DOCUMENTS

| | | | | |
|---|---|---|---|---|
| 2010/0074109 | A1* | 3/2010 | Klingenbrunn | H04W 36/16 370/230 |
| 2018/0255499 | A1* | 9/2018 | Loehr | H04W 40/22 |
| 2019/0029057 | A1* | 1/2019 | Pan | H04W 76/10 |
| 2019/0149365 | A1* | 5/2019 | Chatterjee | H04L 25/0226 370/329 |
| 2019/0215887 | A1* | 7/2019 | Burbidge | H04W 76/27 |
| 2019/0313262 | A1* | 10/2019 | Huang-Fu | H04W 24/02 |
| 2020/0154304 | A1* | 5/2020 | Cho | H04W 28/0268 |
| 2020/0359254 | A1* | 11/2020 | Huang-Fu | H04W 80/10 |
| 2021/0014721 | A1* | 1/2021 | Youn | H04W 28/24 |
| 2021/0092708 | A1* | 3/2021 | Ryu | H04W 76/27 |
| 2021/0352608 | A1* | 11/2021 | Chun | H04M 1/724 |
| 2022/0022089 | A1* | 1/2022 | Zhu | H04W 56/001 |
| 2022/0078692 | A1* | 3/2022 | Stojanovski | H04W 36/32 |
| 2022/0086698 | A1* | 3/2022 | Yao | H04W 28/0273 |
| 2022/0116814 | A1* | 4/2022 | Di Girolamo | H04W 4/027 |
| 2022/0150950 | A1* | 5/2022 | Islam | H04L 1/1896 |
| 2022/0279021 | A1* | 9/2022 | Raleigh | H04L 63/0236 |
| 2023/0047656 | A1* | 2/2023 | Centonza | H04W 64/00 |

FOREIGN PATENT DOCUMENTS

| | | | | |
|---|---|---|---|---|
| WO | WO-2011149532 | A1 * | 12/2011 | G06Q 30/016 |
| WO | WO-2012075347 | A1 * | 6/2012 | G06F 17/00 |
| WO | WO-2017196386 | A1 * | 11/2017 | H04W 28/0268 |

OTHER PUBLICATIONS

"3rd Generation Partnership Project; Technical Specification Group Radio Access Network; NR; Radio Resource Control (RRC) protocol specification (Release 15)", 3GPP TS 38.331 v15.7.0, (Sep. 2019), 527 pages.

Huawei et al., "Corrections to Handling of Alternative QoS Profiles", 3GPP TSG-WG SA2 Meeting #136, S2-1912776, CR 1785, (Nov. 14-18, 2019), 6 pages.

International Search Report and Written Opinion for Patent Cooperation Treaty Application No. PCT/FI2020/050851 dated Mar. 17, 2021, 17 pages.

Nokia et al., "Notification for Alternative QoS Profiles", 3GPP TSG-RAN WG2 Meeting #108, R2-1914604, (Nov. 18-22, 2019), 2 pages.

* cited by examiner

METHOD, APPARATUS, AND COMPUTER PROGRAM PRODUCT FOR ALTERNATIVE QUALITY OF SERVICE PROFILE NOTIFICATION HANDLING

CROSS-REFERENCE TO RELATED APPLICATIONS

This application is a national phase entry of International Application No. PCT/FI2020/050851, filed Dec. 18, 2020, which claims priority to U.S. Provisional Patent Application Ser. No. 62/953,048, filed on Dec. 23, 2019, the contents of which are hereby incorporated by reference in their entirety.

TECHNOLOGICAL FIELD

The subject matter described herein relates to wireless communications, and more particularly, to managing quality of service notifications in a wireless network.

BACKGROUND

Telecommunication networks, such as the fifth generation of mobile networks (5G networks) are expected to be the next major phase of mobile telecommunication standards and to bring many improvements in mobile network user experience. For instance, 5G networks should provide new technical solutions allowing a greater throughput, lower latency, higher reliability, higher connectivity and higher mobility range. In addition to these improvements in terms of performance, 5G networks are also expected to extend the flexibility in the network usage and to allow providing users with a wider range of use cases and business models.

The $3^{rd}$ Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards.

In wireless telecommunication networks, quality of service (QoS) is the description or measurement of the overall performance of the wireless telecommunication service, particularly the performance seen by users of the network. Additionally, QoS may refer to traffic prioritization and resource reservation control mechanisms and define the ability to provide different priority to different applications, users, data flows, and/or to guarantee a certain level of performance to a data flow.

Under current 3GPP standards, recent contributions include non-access stratum (NAS) signaling to user equipment (UE) in order to inform the UE of changes to QoS parameters (e.g., during times at which QoS parameters and/or profiles are changed by the network). This NAS signaling is to be provided via the signal radio bearer 2 (SRB2) channel of the network. However, certain issues may arise with this configuration. From a radio perspective, this configuration may bring about additional signaling overhead, which should be limited. From an application perspective, explicit notifications of changes to QoS transmitted by the network to the UE may not always be necessary, such that the application may not require the notification or alternatively, the UE may comprise mechanisms for internal deduction of the change in QoS and may provide internal feedback. Additionally, from a transmission perspective, providing signaling over SRB2 may be inefficient as SRB2 is considered a lower priority channel than others and thus, the notifications may not always be transmitted.

BRIEF SUMMARY

A method, apparatus, and computer program product are disclosed for generating and providing a signaling indicator to manage quality of service notifications in a network. Benefits of certain embodiments may include one or more of a reduction in signaling overhead, increased network bandwidth and less processing consumption at a user device by limiting unnecessary notifications to the user device, as well as increased transmission reliability and/or latency by utilizing a control protocol data unit in accordance with service data access protocol (SDAP) in instances in which higher priority than SRB2 is required.

A method, apparatus, and computer program product are disclosed for generating and providing a signaling indicator to manage quality of service notifications in a network. Benefits of this design include a reduction in signaling overhead, increased network bandwidth and less processing consumption at a user device by limiting unnecessary notifications to the user device, as well as increased transmission reliability and/or latency by utilizing a control protocol data unit in accordance with service data access protocol (SDAP) in instances in which higher priority than SRB2 is required.

In one aspect, a method is provided. The method comprises receiving a signaling indicator from a user device, wherein the signaling indicator comprises data associated with one or more preferences of the user device. The method further comprises receiving a quality of service notification associated with the user device. The method further comprises determining, based on the signaling indicator, whether to provide the quality of service notification to the user device. In some embodiments, the signaling indicator and quality of service notification are received at a session management function module. In some embodiments, the signaling indicator is received via a non-access stratum message during a protocol data unit session. In some embodiments, the signaling indicator is received via a non-access stratum message during a protocol data unit session establishment. In some embodiments, the signaling indicator is received via a non-access stratum message during a protocol data unit session modification request. In some embodiments, the signaling indicator and quality of service notification are received at a base station node. In some embodiments, the base station node comprises a next generation radio access network node (NG-RAN). In some embodiments, the quality of service notification is received from a session management function module.

In some embodiments, the method further comprises transmitting data associated with the one or more preferences of the signaling indicator to a session management function module. In some embodiments, the signaling indicator is received via an access stratum message during a protocol data unit session. In some embodiments, the signaling indicator is received via an access stratum message during a radio resource control connection establishment. In some embodiments, the signaling indicator is received via an access stratum message during a radio resource control reconfiguration associated with a quality of service flow. In some embodiments, the signaling indicator is received via an access stratum message during a radio resource control reconfiguration associated with a dedicated radio bearer. In some embodiments, the signaling indicator is inferred using a reflective mapping. In some embodiments, the signaling indicator is received in response to reception of a quality of service notification at the user device. In some embodiments, the method further comprises, in an instance in which it is determined that the user device is to receive the quality of service notification, providing the quality of service notification to the user device. In some embodiments, the quality of service notification is provided to the user device via a control protocol data unit in accordance with service data adaptation protocol (SDAP). In some embodiments, the quality of service notification is provided to the user device via a control protocol data unit in accordance with service data adaptation protocol (SDAP) in an instance in which the quality of service notification is associated with a priority level of a logical channel exceeding a priority level associated with signal radio bearer 2 (SRB2) channel.

In some embodiments, the method further comprises, in an instance in which it is determined that the user device is to not receive the quality of service notification, determining not to provide the quality of service notification to the user device. In some embodiments, the signaling indicator is received at a session management function module via a next generation application protocol (NGAP) message relaying the signaling indicator received at a base station node. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In another aspect, an apparatus method is provided comprising at least one processor and at least one memory including computer program code, the at least one memory and the computer program code configured to, with the at least one processor, cause the apparatus at least to receive a signaling indicator from a user device, wherein the signaling indicator comprises data associated with one or more preferences of the user device. The at least one memory and the computer program code are further configured to, with the at least one processor, cause the apparatus to receive a quality of service notification associated with the user device. The at least one memory and the computer program code are further configured to, with the at least one processor, cause the apparatus to determine, based on the signaling indicator, whether to provide the quality of service notification to the user device. In some embodiments, the signaling indicator and quality of service notification are received at a session management function module. In some embodiments, the signaling indicator is received via a non-access stratum message during a protocol data unit session. In some embodiments, the signaling indicator is received via a non-access stratum message during a protocol data unit session establishment. In some embodiments, the signaling indicator is received via a non-access stratum message during a protocol data unit session modification request. In some embodiments, the signaling indicator and quality of service notification are received at a base station node. In some embodiments, the base station node comprises a next generation radio access network node (NG-RAN). In some embodiments, the quality of service notification is received from a session management function module.

In some embodiments, the at least one memory and the computer program code are further configured to, with the at least one processor, cause the apparatus to transmit data associated with the one or more preferences of the signaling indicator to a session management function module. In some embodiments, the signaling indicator is received via an access stratum message during a protocol data unit session. In some embodiments, the signaling indicator is received via an access stratum message during a radio resource control connection establishment. In some embodiments, the signaling indicator is received via an access stratum message during a radio resource control reconfiguration associated with a quality of service flow. In some embodiments, the signaling indicator is received via an access stratum message during a radio resource control reconfiguration associated with a dedicated radio bearer. In some embodiments, the signaling indicator is inferred using a reflective mapping. In some embodiments, the signaling indicator is received in response to reception of a quality of service notification at the user device. In some embodiments, the at least one memory and the computer program code are further configured to, with the at least one processor, cause the apparatus to, in an instance in which it is determined that the user device is to receive the quality of service notification, provide the quality of service notification to the user device. In some embodiments, the quality of service notification is provided to the user device via a control protocol data unit in accordance with service data adaptation protocol (SDAP). In some embodiments, the quality of service notification is provided to the user device via a control protocol data unit in accordance with service data adaptation protocol (SDAP) in an instance in which the quality of service notification is associated with a priority level of a logical channel exceeding a priority level associated with signal radio bearer 2 (SRB2) channel.

In some embodiments, the at least one memory and the computer program code are further configured to, with the at least one processor, cause the apparatus to, in an instance in which it is determined that the user device is to not receive the quality of service notification, determine not to provide the quality of service notification to the user device. In some embodiments, the signaling indicator is received at a session management function module via a next generation application protocol (NGAP) message relaying the signaling indicator received at a base station node. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In another aspect, a computer program product is provided comprising a non-transitory computer readable storage medium having program code portions stored thereon, the program code portions configured, upon execution, to receive a signaling indicator from a user device, wherein the signaling indicator comprises data associated with one or more preferences of the user device. The program code portions are further configured, upon execution, to receive a quality of service notification associated with the user device. The program code portions are further configured, upon execution, to determine, based on the signaling indicator, whether to provide the quality of service notification to the user device. In some embodiments, the signaling indicator and quality of service notification are received at a session management function module. In some embodiments, the signaling indicator is received via a non-access stratum message during a protocol data unit session. In some embodiments, the signaling indicator is received via a non-access stratum message during a protocol data unit session establishment. In some embodiments, the signaling indicator is received via a non-access stratum message during a protocol data unit session modification request. In some embodiments, the signaling indicator and quality of service notification are received at a base station node. In some embodiments, the base station node comprises a next generation radio access network node (NG-RAN). In some embodiments, the quality of service notification is received from a session management function module.

In some embodiments, the program code portions are further configured, upon execution, to transmit data associated with the one or more preferences of the signaling indicator to a session management function module. In some embodiments, the signaling indicator is received via an access stratum message during a protocol data unit session. In some embodiments, the signaling indicator is received via an access stratum message during a radio resource control connection establishment. In some embodiments, the signaling indicator is received via an access stratum message during a radio resource control reconfiguration associated with a quality of service flow. In some embodiments, the signaling indicator is received via an access stratum message during a radio resource control reconfiguration associated with a dedicated radio bearer. In some embodiments, the signaling indicator is inferred using a reflective mapping. In some embodiments, the signaling indicator is received in response to reception of a quality of service notification at the user device.

In some embodiments, the program code portions are further configured, upon execution, to, in an instance in which it is determined that the user device is to receive the quality of service notification, provide the quality of service notification to the user device. In some embodiments, the quality of service notification is provided to the user device via a control protocol data unit in accordance with service data adaptation protocol (SDAP). In some embodiments, the quality of service notification is provided to the user device via a control protocol data unit in accordance with service data adaptation protocol (SDAP) in an instance in which the quality of service notification is associated with a priority level of a logical channel exceeding a priority level associated with signal radio bearer 2 (SRB2) channel. In some embodiments, the program code portions are further configured, upon execution, to, in an instance in which it is determined that the user device is to not receive the quality of service notification, determine not to provide the quality of service notification to the user device. In some embodiments, the signaling indicator is received at a session management function module via a next generation application protocol (NGAP) message relaying the signaling indicator received at a base station node. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In a further aspect, an apparatus is provided comprising means for receiving a signaling indicator from a user device, wherein the signaling indicator comprises data associated with one or more preferences of the user device. The apparatus further comprises means for receiving a quality of service notification associated with the user device. The apparatus further comprises means for determining, based on the signaling indicator, whether to provide the quality of service notification to the user device. In some embodiments, the signaling indicator and quality of service notification are received at a session management function module. In some embodiments, the signaling indicator is received via a non-access stratum message during a protocol data unit session. In some embodiments, the signaling indicator is received via a non-access stratum message during a protocol data unit session establishment. In some embodiments, the signaling indicator is received via a non-access stratum message during a protocol data unit session modification request. In some embodiments, the signaling indicator and quality of service notification are received at a base station node. In some embodiments, the base station node comprises a next generation radio access network node (NG-RAN). In some embodiments, the quality of service notification is received from a session management function module.

In some embodiments, the apparatus further comprises means for transmitting data associated with the one or more preferences of the signaling indicator to a session management function module. In some embodiments, the signaling indicator is received via an access stratum message during a protocol data unit session. In some embodiments, the signaling indicator is received via an access stratum message during a radio resource control connection establishment. In some embodiments, the signaling indicator is received via an access stratum message during a radio resource control reconfiguration associated with a quality of service flow. In some embodiments, the signaling indicator is received via an access stratum message during a radio resource control reconfiguration associated with a dedicated radio bearer. In some embodiments, the signaling indicator is inferred using a reflective mapping. In some embodiments, the signaling indicator is received in response to reception of a quality of service notification at the user device. In some embodiments, the apparatus further comprises means for, in an instance in which it is determined that the user device is to receive the quality of service notification, providing the quality of service notification to the user device. In some embodiments, the quality of service notification is provided to the user device via a control protocol data unit in accordance with service data adaptation protocol (SDAP). In some embodiments, the quality of service notification is provided to the user device via a control protocol data unit in accordance with service data adaptation protocol (SDAP) in an instance in which the quality of service notification is associated with a priority level of a logical channel exceeding a priority level associated with signal radio bearer 2 (SRB2) channel.

In some embodiments, the apparatus further comprises means for, in an instance in which it is determined that the user device is to not receive the quality of service notification, determining not to provide the quality of service notification to the user device. In some embodiments, the signaling indicator is received at a session management function module via a next generation application protocol (NGAP) message relaying the signaling indicator received at a base station node. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In another aspect, a method is provided. The method comprises generating, at a user device, a signaling indicator comprising data associated with one or more preferences of the user device. The method further comprises causing transmission of the signaling indicator to a network element. In some embodiments, the network element comprises a session management function module. In some embodiments, the signaling indicator is transmitted via a non-access stratum message during a protocol data unit session. In some embodiments, the signaling indicator is generated and transmitted during a protocol data unit session establishment. In some embodiments, the signaling indicator is generated and transmitted during a protocol data unit session modification request. In some embodiments, the network element comprises a base station node. In some embodiments, the base station node comprises a next generation radio access network node (NG-RAN). In some embodiments, the signaling indicator is generated and transmitted during a radio resource control connection establishment. In some embodiments, the signaling indicator is generated and transmitted during a radio resource control reconfiguration associated with a quality of service flow. In some embodiments, the signaling indicator is generated and transmitted during a radio resource control reconfiguration associated with a dedicated radio bearer. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In another aspect, an apparatus is provided comprising processing circuitry and at least one memory including computer program code, the at least one memory and the computer program code configured to, with the processing circuitry, cause the apparatus at least to generate, at a user device, a signaling indicator comprising data associated with one or more preferences of the user device. The at least one memory and the computer program code are further configured to, with the processing circuitry, cause the apparatus to cause transmission of the signaling indicator to a network element. In some embodiments, the network element comprises a session management function module. In some embodiments, the signaling indicator is transmitted via a non-access stratum message during a protocol data unit session. In some embodiments, the signaling indicator is generated and transmitted during a protocol data unit session establishment. In some embodiments, the signaling indicator is generated and transmitted during a protocol data unit session modification request. In some embodiments, the network element comprises a base station node. In some embodiments, the base station node comprises a next generation radio access network node (NG-RAN). In some embodiments, the signaling indicator is generated and transmitted during a radio resource control connection establishment. In some embodiments, the signaling indicator is generated and transmitted during a radio resource control reconfiguration associated with a quality of service flow. In some embodiments, the signaling indicator is generated and transmitted during a radio resource control reconfiguration associated with a dedicated radio bearer. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In another aspect, a computer program product is provided comprising a non-transitory computer readable storage medium having program code portions stored thereon, the program code portions configured, upon execution, to generate, at a user device, a signaling indicator comprising data associated with one or more preferences of the user device. The program code portions are further configured, upon execution, to cause transmission of the signaling indicator to a network element. In some embodiments, the network element comprises a session management function module. In some embodiments, the signaling indicator is transmitted via a non-access stratum message during a protocol data unit session. In some embodiments, the signaling indicator is generated and transmitted during a protocol data unit session establishment. In some embodiments, the signaling indicator is generated and transmitted during a protocol data unit session modification request. In some embodiments, the network element comprises a base station node. In some embodiments, the base station node comprises a next generation radio access network node (NG-RAN). In some embodiments, the signaling indicator is generated and transmitted during a radio resource control connection establishment. In some embodiments, the signaling indicator is generated and transmitted during a radio resource control reconfiguration associated with a quality of service flow. In some embodiments, the signaling indicator is generated and transmitted during a radio resource control reconfiguration associated with a dedicated radio bearer. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

In another aspect, an apparatus is provided comprising means for generating, at a user device, a signaling indicator comprising data associated with one or more preferences of the user device. The apparatus further comprises means for causing transmission of the signaling indicator to a network element. In some embodiments, the network element comprises a session management function module. In some embodiments, the signaling indicator is transmitted via a non-access stratum message during a protocol data unit session. In some embodiments, the signaling indicator is generated and transmitted during a protocol data unit session establishment. In some embodiments, the signaling indicator is generated and transmitted during a protocol data unit session modification request. In some embodiments, the network element comprises a base station node. In some embodiments, the base station node comprises a next generation radio access network node (NG-RAN). In some embodiments, the signaling indicator is generated and transmitted during a radio resource control connection establishment. In some embodiments, the signaling indicator is generated and transmitted during a radio resource control reconfiguration associated with a quality of service flow. In some embodiments, the signaling indicator is generated and transmitted during a radio resource control reconfiguration associated with a dedicated radio bearer. In some embodiments, the one or more preferences of the user device indicates a preference that at least one of (i) quality of service notifications associated with a particular quality of service flow, (ii) quality of service notifications that relate to one or more quality of service flows associated with a particular dedicated radio bearer, or (iii) quality of service notifications that relate to all quality of service flows associated with a particular protocol data unit session are not to be transmitted to the user device.

BRIEF DESCRIPTION OF THE DRAWINGS

Figure 1:
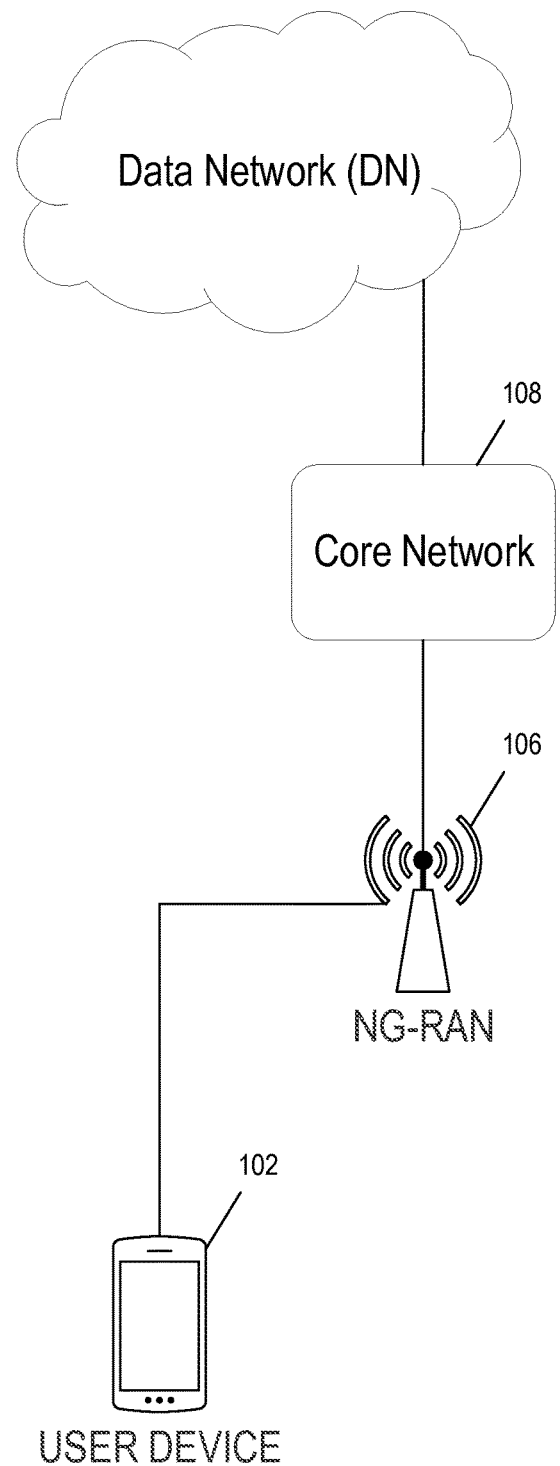
Figure 2:
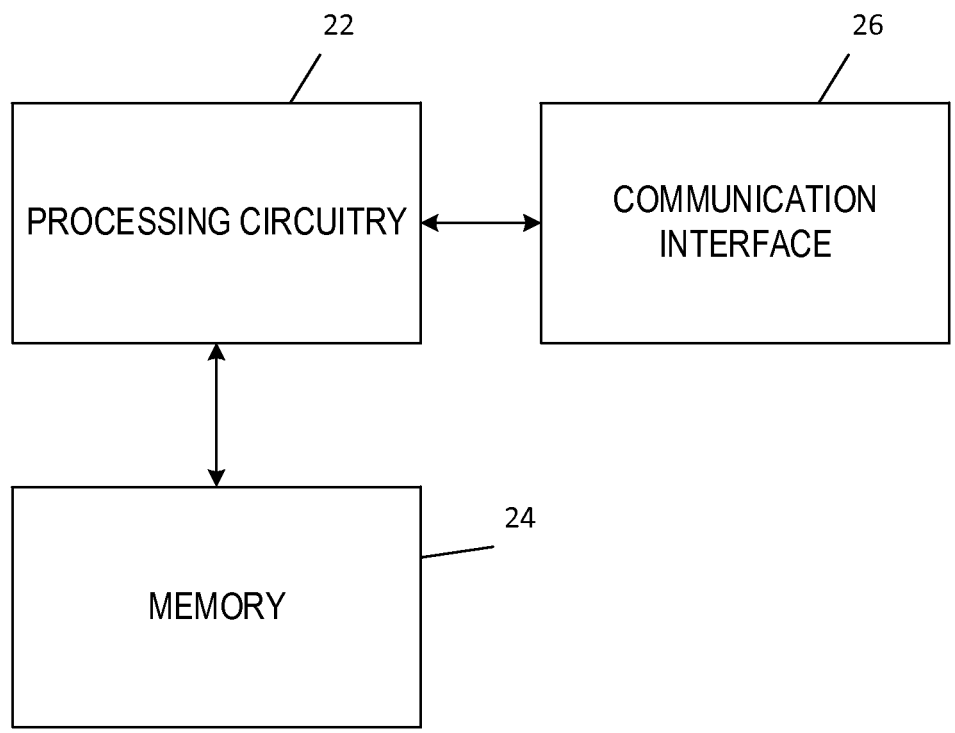
Figure 3:
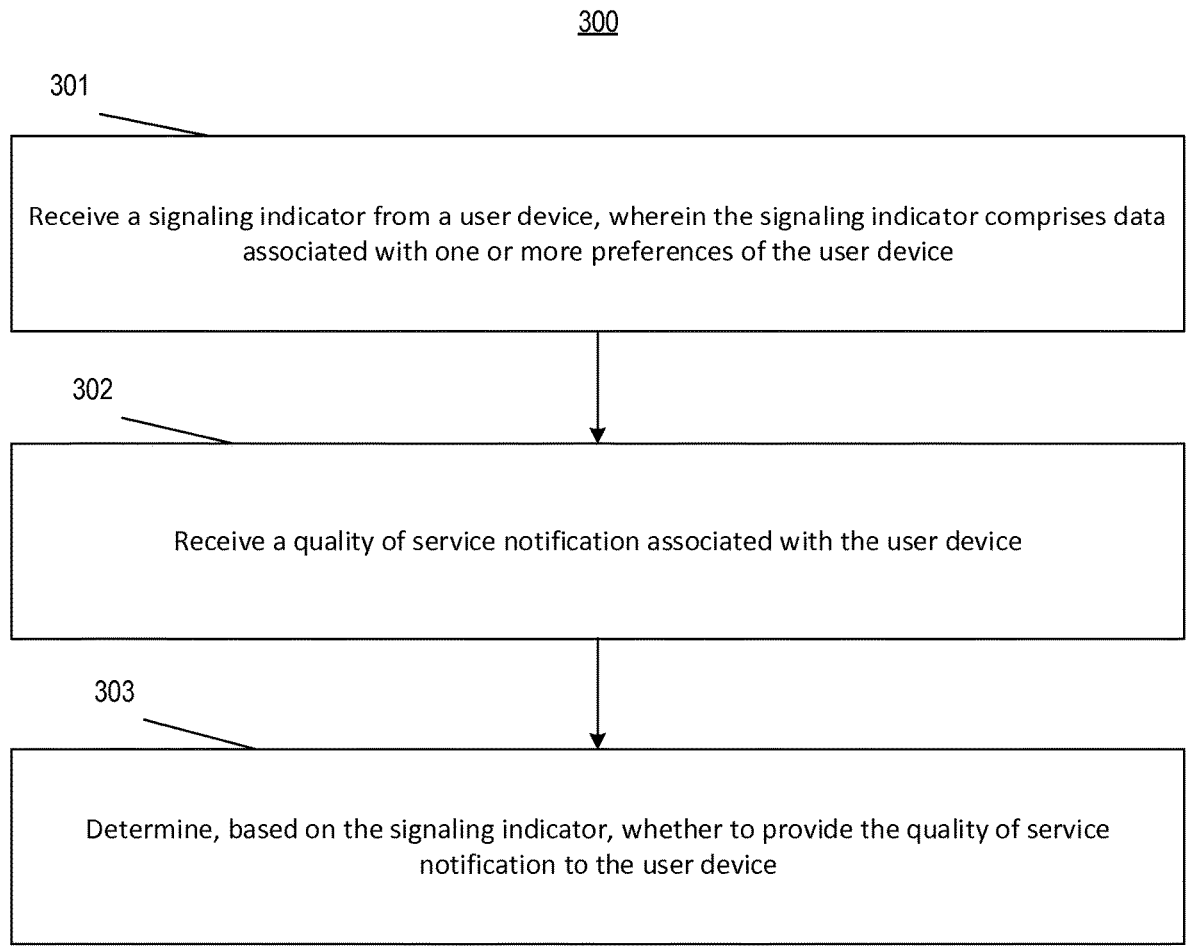
Figure 4:
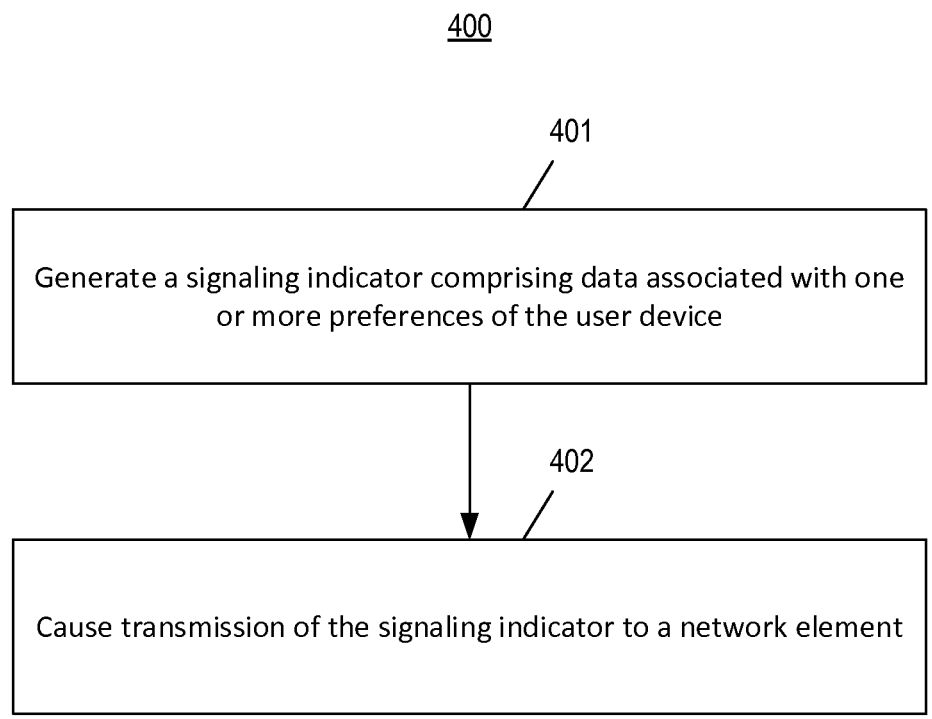

Having thus described certain example embodiments of the present disclosure in general terms, reference will hereinafter be made to the accompanying drawings, which are not necessarily drawn to scale, and wherein:

FIG. 1 is a block diagram of an example network configuration in accordance with an embodiment of the present disclosure;

FIG. 2 is a block diagram of an apparatus that may be specifically configured in accordance with an example embodiment of the present disclosure;

FIG. 3 is a flow chart illustrating the operations performed in accordance with an example embodiment; and FIG. 4 is a flow chart illustrating the operations performed in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Additionally, as used herein, the term 'module' refers to hardware or a combination of hardware and software in which the execution of the software directs operation of the hardware.

As described above, a 3GPP system architecture working group, SA2, has developed agreed upon alternative QoS profiles. Mechanisms related to alternative QoS profiles have previously been contained within the network, however recent standard additions relate to triggering NAS signaling to user equipment (e.g., user devices). In particular, change request S2-1912776 reads that "the SMF module uses NAS signaling (sent transparently through the RAN) to inform the UE about changes in the QoS parameters that the NG-RAN is currently fulfilling for the QoS flow after notification control or handover related signaling has occurred." NAS signaling is sent on the signal radio bearer 2 (SRB2) channel, however, SRB2 has a lower priority than other signal radio bearers, such as signal radio bearer 1 (SRB1).

These new additions to the standard bring challenges such as additional signaling overhead, unnecessary data transmissions and load on the network by transmitting all QoS notifications, and priority issues which may lead to necessary notifications failing to be transmitted.

FIG. 1 depicts an example of a portion of a 5G wireless network 100 deployed in accordance with some example embodiments. The 5G wireless network 100 may include user equipment (UE), such as a user device 102, configured to wirelessly couple (e.g., via an air interface) to a radio access network (RAN) being served by a wireless access point, such as a base station 106, wireless local area network access point, home base station, and/or other type of wireless access point. While certain embodiments described herein relate to 5G networks, it is to be appreciated that networks other than 5G networks may be used.

The network 100 may include the core network 108, which may include a core access and mobility management function (AMF). The AMF may be used for various network tasks such as registration management, connection management, reachability management, mobility management, and/or or other various functions relating to security and access management and authorization. The network 100 and/or core network may further include features such as a session management function (SMF) module. The SMF module may be used for various responsibilities such as creating, updating, and/or removing Protocol Data Unit (PDU) sessions and managing session context with the User Plane Function (UPF) of the network. The SMF may also use the non-access stratum (NAS), a functional layer used to manage the establishment of communication sessions and to maintain continuous communications with UE, in order to inform the user device of changes in QoS parameters which the RAN may be currently fulfilling.

In some embodiments, the network 100 and/or the core network may include devices having functions supporting a home public land mobile network (HPLMN) and corresponding functions for "home" wireless local area network (WLAN) access, offloading, and/or non-3GPP access. These devices may include a unified data management (UDM) module, a unified data repository, an over-the-air function (OTAF) module, and/or other non-illustrated features such as a home policy control function (PCF), a home network slice selection function (NSSF), an authentication server function (AUSF), an application function (AF), a home user plane function (H-UPF), and a data network (DN).

One example of an apparatus 200 that may be configured to function as and/or be embodied by the SMF module, base station 106, user device 102, and/or the like is depicted in FIG. 2. As shown in FIG. 2, the apparatus includes, is associated with or is in communication with processing circuitry 22, a memory 24 and a communication interface 26. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally, or alternatively, the memory device could be configured to store instructions for execution by the processing circuitry.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3, a method 300 performed by the SMF module or, in some embodiments, the base station 106, is depicted. As shown in block 301, the SMF module and/or base station 106 includes means, such as the processing circuitry 22, the communication interface 26 or the like, for receiving a signaling indicator. For example, the SMF module and/or base station 106 may receive the signaling indicator from the UE, such as user device 102. The signaling indicator may be generated at the user device 102 and by the user device.

In some embodiments, the signaling indicator may comprise data associated with one or more preferences of the user device 102, such as preferences related to reception of quality of service notifications. As an example, the signaling indicator may comprise data and/or instructions to allow the user device 102 to control whether quality of service notifications (e.g., a notification of changes to QoS parameters, a notification of a QoS profile change such as an alternative QoS profile, and/or the like) are transmitted to the user device or not. In some embodiments, the signaling indicator may be included as a portion of a message transmitted by the user device 102 via the access stratum (AS) or non-access stratum (NAS) during a protocol data unit (PDU) session. In this regard, the base station 106 may receive the signaling indicator in an instance in which the user device 102 transmits the signaling indicator via the AS. The SMF module may receive the signaling indicator in an instance in which the user device 102 transmits the signaling indicator via the NAS.

In some embodiments, the signaling indicator may be received at the base station 106 during a particular event. For example, the signaling indicator may be received at the base station 106 via the AS during a radio resource control (RRC) connection establishment at the user device 102. In another example, the signaling indicator may be received at the base station 106 via the AS during an RRC reconfiguration associated with a QoS flow or newly added or modified dedicated radio bearer (DRB). In a further example, the signaling indicator may be received at the base station 106 via the AS during a reflective mapping by the network. In this regard, the signaling indicator may be inferred by the network using a reflective mapping.

In some embodiments, the signaling indicator may be received at the SMF module via the NAS during a particular event. For example, the signaling indicator may be received at the SMF module via the NAS during a PDU session establishment. In another example, the signaling indicator may be received at the SMF module via the NAS during a PDU session modification request.

In some embodiments, the signaling indicator may be received at the SMF module and/or base station 106 via the AS or the NAS in response to reception of a quality of service notification at the user device 102. In this regard, reception of a quality of service notification by the user device 102 may act as a trigger for the user device 102 to transmit the signaling indicator.

In some embodiments, the signaling indicator may be received (e.g., at the SMF module) via a next generation application protocol (NGAP) message that may serve to relay the signaling indicator when received at the base station node 106.

As shown in block 302, the SMF module and/or base station 106 includes means, such as the processing circuitry 22, the communication interface 26 or the like, for receiving a quality of service notification associated with the user device. For example, the SMF module may receive a QoS notification from an element in the network 100, such as from the NG-RAN and/or the like. In another example, the base station 106, such as communication interface 26, processing circuitry 22 and/or the like, may receive a QoS notification from an element in the network 100, such as from the SMF module and/or the like. As described above, the QoS notification may comprise a change in one or more QoS parameters related to the user device 102 and/or a change in a QoS profile related to the user device 102.

As shown in block 303, the SMF module and/or base station 106 includes means, such as the processing circuitry 22, the communication interface 26 or the like, for determining whether to provide the quality of service notification to the user device. For example, the SMF module and/or base station 106, such as communication interface 26, processing circuitry 22 and/or the like, may determine whether to provide the quality of service notification to the user device upon receiving a quality of service notification as described above in operation 302. In this regard, the determination may be based on the signaling indicator received from the user device 102. In some embodiments, the determination may be made based on the signaling indicator and the quality of service notification. For example, the signaling indicator may indicate that a QoS notification should be provided to the user device in an instance in which the QoS notification is associated with a certain type of change (e.g., a change in one or more predefined QoS parameters, a change in one or more predefined QoS profiles, and/or the like). As another example, the signaling indicator and associated preferences may indicate that QoS notifications associated with a particular QoS flow, QoS notifications that relate to one or more QoS flows associated with (e.g., mapped to) a particular DRB, and/or QoS notifications that relate to all QoS flows associated with (e.g., mapped to) a particular PDU session are not to be transmitted to the user device 102. As a further example, the signaling indicator may indicate that no QoS notifications should be transmitted to the user device 102.

In some embodiments, upon the base station receiving a signaling indicator from a user device 102, the base station 106 may transmit data associated with one or more preferences of the received signaling indicator to the SMF module in order to directly inform the SMF of the QoS preferences of the user device 102, such that the SMF module may subsequently transmit only QoS notifications in accordance with the preferences of the signaling indicator. In this regard, only QoS notifications that are desired by the user device need be transmitted to the base station for subsequent transmission to the user device, thereby alleviating impact on the network and at the user device 102 by not transmitting unnecessary QoS notifications.

Following operation 303, in an instance in which it is determined that the user device is to receive the quality of service notification, the SMF module and/or base station 106 includes means, such as the processing circuitry 22, the communication interface 26 or the like, for providing the quality of service notification to the user device. In this regard, the SMF module and/or base station 106, such as communication interface 26, processing circuitry 22 and/or the like, may transmit the quality of service notification to the user device 102. In some embodiments, the quality of service notification may be transmitted via SRB2. Similarly, in an instance in which it is determined that the user device is not to receive the quality of service notification, the SMF module and/or base station 106 includes means, such as the processing circuitry 22, the communication interface 26 or the like, for determining to not provide the quality of service notification to the user device. In this regard, the SMF module and/or base station 106, such as communication interface 26, processing circuitry 22 and/or the like, may cancel the transmission of the quality of service notification (e.g., remove and/or delete the notification, transmit the notification back to the origin of the notification, and/or the like).

In some embodiments, a control protocol data unit (PDU) may be introduced in accordance with a Service Data Access Protocol (SDAP). SDAP may be responsible for QoS Flow handling across the 5G air interface. In particular, SDAP may map a specific QoS Flow within a PDU Session to a corresponding Data Radio Bearer which has been established with an appropriate level of QoS. In this regard, the control PDU may be used to provide the quality of service notification to the user device rather than SRB2.

In some embodiments, the quality of service notification may be provided to the user device via the control PDU in an instance in which the QoS notification is associated with a priority level of a logical channel exceeding a priority level associated with the SRB2 channel. In this regard, the SMF module and/or base station 106 includes means, such as the processing circuitry 22, the communication interface 26 or the like, for determining whether to transmit the QoS notification to the user device via SRB2 or the control PDU (SDAP) based on a priority level of a logical channel associated with the QoS notification.

Referring now to FIG. 4, a method 400 performed by the user device 102 is depicted. As shown in block 401, the user device 102 includes means, such as the processing circuitry 22, the communication interface 26 or the like, for generating a signaling indicator comprising data associated with one or more preferences of the user device. In this regard, the one or more preferences may comprise preferences associated with receiving quality of service notifications. In some embodiments, the signaling indicator may be generated during, or in response to, a particular event. As described above, the event may comprise one or more of the following: a radio resource control (RRC) connection establishment with the user device 102, an RRC reconfiguration associated with a QoS flow or newly added or modified dedicated radio bearer (DRB), a reflective mapping, a quality of service notification at the user device 102, a PDU session establishment, a PDU session modification request, and/or the like.

As shown in block 402, the user device 102 includes means, such as the processing circuitry 22, the communication interface 26 or the like, for transmitting the signaling indicator to a network element. In some embodiments, the particular network element to which the signaling indicator is transmitted may be based on the type of event. For example, in some embodiments, the network element may be a session management function module. In another embodiment, the network element may be a base station node (e.g., a next generation radio access node (NG-RAN)).

As described above, a method, apparatus, and computer program product are disclosed for generating and providing a signaling indicator to manage quality of service notifications in a network. Benefits of this design include a reduction in signaling overhead, increased network bandwidth and less processing consumption at a user device by limiting unnecessary notifications to the user device, as well as increased transmission reliability and improved latency by utilizing a control protocol data unit in instances in which higher priority than SRB2 is required.

FIGS. 3 and 4 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by a session management function (SMF) module, a signaling indicator from a user device, wherein the signaling indicator comprises data associated with one or more preferences of the user device, wherein the signaling indicator is inferred using a reflective mapping;
   receiving, from a network element by the SMF module, a quality of service notification associated with the user device;
   determining, by the SMF module based on the signaling indicator and the quality of service notification, whether to provide the quality of service notification to the user device, wherein the signaling indicator is received via a non-access stratum message during a protocol data unit session, wherein determining whether to provide the quality of service indicator and quality of service notification comprises:
   determining whether the signaling indicator indicates that the quality of service notification should be provided to the user device based on the quality of service notification being associated with a change in one or more predefined quality of service parameters and a change in one or more predefined quality of service profiles; and
   determining whether the signaling indicator and associated preferences indicate that quality of service notifications are not to be transmitted to the user device based on the signaling indicator and associated preferences indicating the quality of service notifications associated with a particular quality of service flow, quality of service notifications that relate to one or more quality of service flows mapped to a particular dedicated radio bearer (DRB), and quality of service notifications that relate to all quality of service flows mapped to a particular protocol data unit (PDU) session; and based on determining that the user device is to receive the quality of service notification, providing, by the SMF module, the quality of service notification to the user device, wherein the quality of service notification is provided to the user device via a control protocol data unit in accordance with service data adaptation protocol (SDAP) in an instance in which the quality of service notification is associated with a priority level of a logical channel exceeding a priority level associated with a signal radio bearer 2 (SRB2) channel.

2. The method according to claim 1, wherein the signaling indicator is configured to be received via a non-access stratum message during a protocol data unit session establishment.

3. The method according to claim 1, wherein the signaling indicator is configured to be received via a non-access stratum message during a protocol data unit session modification request.

4. The method according to claim 1, wherein the signaling indicator and quality of service notification are received at a base station node.

5. The method according to claim 4, wherein the base station node comprises a next generation radio access network node (NG-RAN).

6. The method according to claim 4, wherein the quality of service notification is received from a session management function module.

7. The method according to claim 4, further comprising: transmitting data associated with the one or more preferences of the signaling indicator to a session management function module.

8. The method according to claim 4, wherein the signaling indicator is received via an access stratum message during a protocol data unit session.

9. The method according to claim 4, wherein the signaling indicator is received via an access stratum message during a radio resource control connection establishment.

10. The method according to claim 4, wherein the signaling indicator is received via an access stratum message during a radio resource control reconfiguration associated with a quality of service flow.

11. The method according to claim 4, wherein the signaling indicator is received via an access stratum message during a radio resource control reconfiguration associated with a dedicated radio bearer.

12. The method according to claim 1, wherein the signaling indicator is received in response to reception of a quality of service notification at the user device.

13. The method according to claim 1, wherein the signaling indicator is received at a session management function module via a next generation application protocol (NGAP) message relaying the signaling indicator received at a base station node.

14. An apparatus comprising:
processing circuitry;
a session management function (SMF) module; and
at least one memory including computer program code, the at least one memory and the computer program code configured to, with the at least one processor, cause the SMF module at least to:
receive a signaling indicator from a user device, wherein the signaling indicator comprises data associated with one or more preferences of the user device, wherein the signaling indicator is inferred using a reflective mapping;
receive a quality of service notification associated with the user device;
determine, based on the signaling indicator, whether to provide the quality of service notification to the user device wherein the signaling indicator is received via a non-access stratum message during a protocol data unit session, wherein determining whether to provide the quality of service indicator and quality of service notification are comprises:
determining whether the signaling indicator indicates that the quality of service notification should be provided to the user device based on the quality of service notification being associated with a change in one or more predefined quality of service parameters and a change in one or more predefined quality of service profiles; and
determining whether the signaling indicator and associated preferences indicate that quality of service notifications are not to be transmitted to the user device based on the signaling indicator and associated preferences indicating the quality of service notifications associated with a particular quality of service flow, quality of service notifications that relate to one or more quality of service flows mapped to a particular dedicated radio bearer (DRB), and quality of service notifications that relate to all quality of service flows mapped to a particular protocol data unit (PDU) session; and
based on determining that the user device is to receive the quality of service notification, providing the quality of service notification to the user device, wherein the quality of service notification is provided to the user device via a control protocol data unit in accordance with service data adaptation protocol (SDAP) in an instance in which the quality of service notification is associated with a priority level of a logical channel exceeding a priority level associated with a signal radio bearer 2 (SRB2) channel.

15. A system comprising:
an apparatus comprising a session management function (SMF) module;
a processor; and
a memory comprising computer-executable instructions that, when executed by the processor, cause the SMF module to perform the following operations:
receive a signaling indicator from a user device, wherein the signaling indicator comprises data associated with one or more preferences of the user device, wherein the signaling indicator is inferred using a reflective mapping;
receive a quality of service notification associated with the user device;
determine, based on the signaling indicator, whether to provide the quality of service notification to the user device, wherein the signaling indicator is received via a non-access stratum message during a protocol data unit session, wherein determining whether to provide the quality of service indicator and quality of service notification are comprises:
determining whether the signaling indicator indicates that the quality of service notification should be provided to the user device based on the quality of service notification being associated with a change in one or more predefined quality of service parameters and a change in one or more predefined quality of service profiles; and determining whether the signaling indicator and associated preferences indicate that quality of service notifications are not to be transmitted to the user device based on the signaling indicator and associated preferences indicating the quality of service notifications associated with a particular quality of service flow, quality of service notifications that relate to one or more quality of service flows mapped to a particular dedicated radio bearer (DRB), and quality of service notifications that relate to all quality of service flows mapped to a particular protocol data unit (PDU) session; and based on determining that the user device is to receive the quality of service notification, providing the quality of service notification to the user device, wherein the quality of service notification is provided to the user device via a control protocol data unit in accordance with service data adaptation protocol (SDAP) in an instance in which the quality of service notification is associated with a priority level of a logical channel exceeding a priority level associated with a signal radio bearer 2 (SRB2) channel.

16. The system according to claim 15, wherein the signaling indicator and quality of service notification are received at a base station node.

17. The system according to claim 16, wherein the base station node comprises a next generation radio access network node (NG-RAN).

18. The system according to claim 16, wherein the quality of service notification is received from a session management function module.

19. The system according to claim 16, wherein the computer-executable instructions, when executed by the processor, further cause the apparatus to perform the following operation: transmitting data associated with the one or more preferences of the signaling indicator to a session management function module.

20. The system according to claim 16, wherein the signaling indicator is received via an access stratum message during a protocol data unit session.

21. The system according to claim 16, wherein the signaling indicator is received via an access stratum message during a radio resource control connection establishment.

22. The system according to claim 16, wherein the signaling indicator is received via an access stratum message during a radio resource control reconfiguration associated with a quality of service flow.

23. The system according to claim 16, wherein the signaling indicator is received via an access stratum message during a radio resource control reconfiguration associated with a dedicated radio bearer.

* * * * *